United States Patent [19]

Durham et al.

[11] 3,940,938
[45] Mar. 2, 1976

[54] CUP SEAL FOR A MASTER BRAKE CYLINDER

[75] Inventors: Donald F. Durham, Peoria; Robert D. McFeeters, Washington, both of Ill.

[73] Assignee: Caterpillar Tractor Co., Peoria, Ill.

[22] Filed: Aug. 9, 1974

[21] Appl. No.: 495,966

[52] U.S. Cl.............. 60/588; 417/511; 277/212 C; 92/245
[51] Int. Cl.².......................................... B60T 11/26
[58] Field of Search ............. 60/588, 589; 417/511; 277/212 C; 92/245

[56] References Cited
UNITED STATES PATENTS

| 73,969 | 2/1868 | Gilberts | 417/511 |
|---|---|---|---|
| 1,372,760 | 3/1921 | Loudenbeck | 277/212 C |
| 1,767,936 | 6/1930 | McElroy et al. | 277/212 C |
| 2,211,403 | 8/1940 | Boldt et al. | 60/588 |
| 2,349,346 | 5/1944 | Goepfrich | 60/588 |
| 2,444,569 | 7/1948 | Katcher | 60/588 |
| 3,181,876 | 5/1965 | Felt | 277/212 C |
| 3,800,541 | 4/1974 | Sindelar et al. | 60/588 |

FOREIGN PATENTS OR APPLICATIONS

| 859,529 | 12/1940 | France | 277/212 C |

*Primary Examiner*—Martin P. Schwadron
*Assistant Examiner*—H. Burks, Sr.
*Attorney, Agent, or Firm*—Phillips, Moore, Weissenberger Lempio & Strabala

[57] ABSTRACT

A master brake cylinder comprises a spring biased piston reciprocally mounted in a bore defined in a housing thereof. A cup seal, disposed in the bore to abut the piston, comprises a flexible annular flange portion having a plurality of circumferentially disposed grooves formed thereon to induce rotation of the cup seal upon the return stroke of the piston, subsequent to a braking operation. The cup seal is composed of a cured elastomeric material having a cup-shaped reinforcing fabric encapsulated therein.

15 Claims, 4 Drawing Figures

CUP SEAL FOR A MASTER BRAKE CYLINDER

BACKGROUND OF THE INVENTION

Conventional rubber cup seals employed in master brake cylinders are prone to wear and distortion, thus requiring replacement thereof after extended use. The cup seal is normally reciprocated in a working bore by a push-rod assembly to force hydraulic fluid into the wheel cylinders of band or disc brakes. The brake cylinder has a fluid reservoir which communicates with the bore via refill and compensating passages to continuously supply adequate fluid thereto for brake actuation purposes.

Upon movement of the cup seal into masking relationship over the passages, portions of the seal will tend to become distorted thereat. Such distortion is primarily occasioned by the high fluid pressures, e.g. 1,800 psi, prevalent in the bore of the cylinder during brake actuation. In particular, portions of the seal tend to be extruded into the above mentioned passages to eventually permanently damage and/or distort the seal to render the braking system leak prone and possibly inoperative.

SUMMARY OF THIS INVENTION

An object of this invention is to provide an economical and improved piston cup seal which will exhibit a long life expectancy when used in a master brake cylinder, for example. Such desiderata may be attributed to means, preferably a plurality of circumferentially disposed grooves formed on a flange portion of the cup seal, for inducing rotation of the cup seal upon reciprocation thereof. Such long life expectancy and durability is further increased by capsulating a reinforcing fabric in at least the flange portion of the cup seal to rigidify the same.

BRIEF DESCRIPTION OF THE DRAWINGS

Other objects of this invention will become apparent from the following description and accompanying drawing wherein.

DETAILED DESCRIPTION OF THE DRAWINGS

Figure 1:
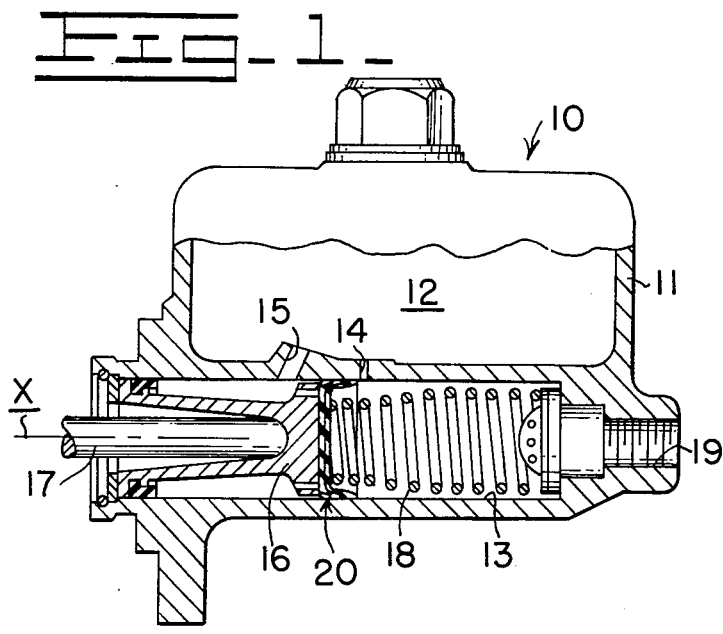
FIG. 1 is a partially sectioned view of a master brake cylinder employing the piston cup seal of this invention therein and shown in its retracted position.

FIG. 1 illustrates a master brake cylinder 10 comprising a housing 11 defining a fluid reservoir 12 and a working bore 13 therein. The chamber and bore communicate with each other via a compensating port 14 and a refill passage 15 which function during a braking operation in a conventional manner. A push-rod assembly comprises a piston 16 reciprocally mounted in bore 13 for movement along a longitudinal axis X and biased leftwardly against a push-rod 17 by a compression coil spring 18.

The push-rod is adapted for connection by suitable linkage to a conventional brake pedal (not shown) for selectively moving the piston rightwardly in bore 13. Such movement functions to discharge pressurized brake fluid through a port 19, adapted to be connected to one or more wheel cylinders (not shown) of a conventional braking system. A piston cup seal 20 of this invention is disposed between the rightward end of the piston and the leftward end of the spring.

Figure 4:
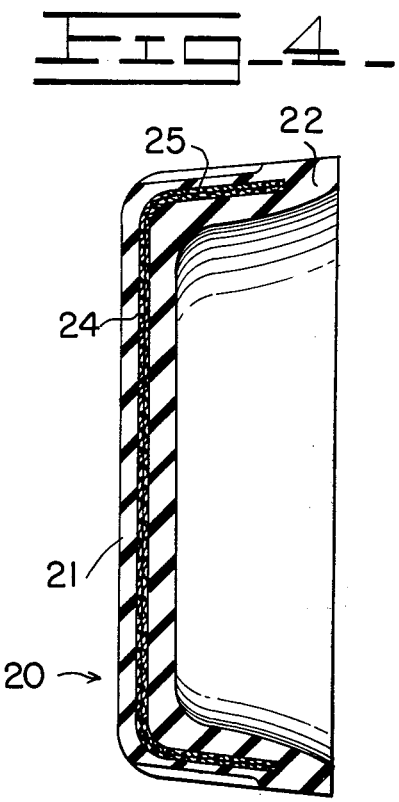
FIG. 4 is a cross sectional view of the cup seal, taken in the direction of arrows IV—IV in FIG. 2.
Figure 2:
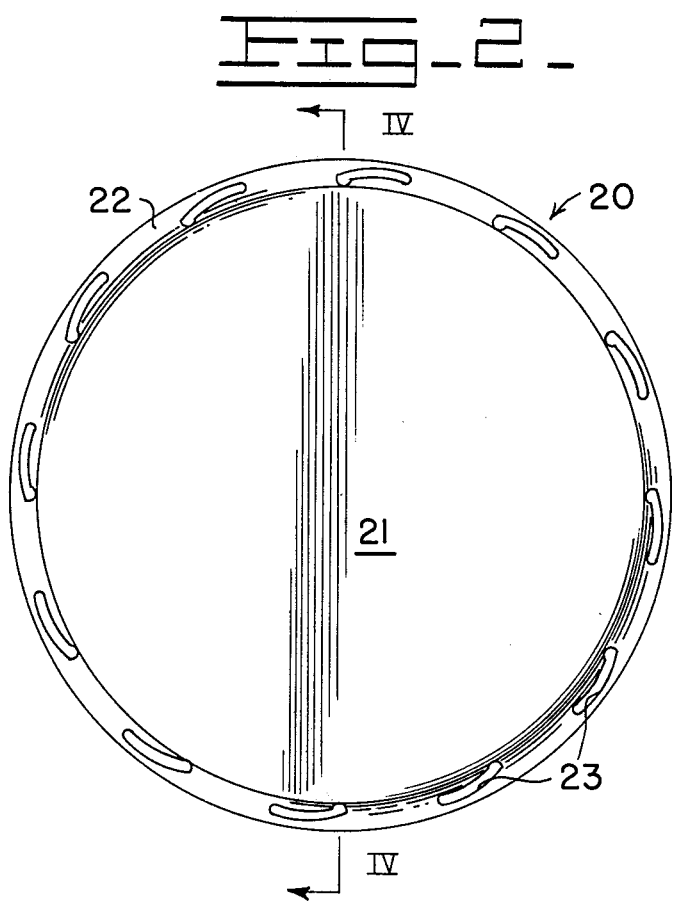
FIG. 2 is an enlarged, back side view of the cup seal.
Figure 3:
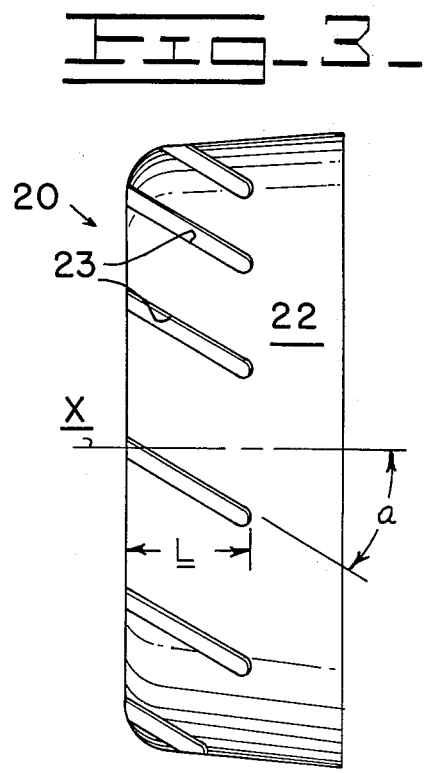
FIG. 3 is a side elevational view of the cup seal.

The cup seal is preferably disposed in unsecured relationship with respect to the piston and spring to permit it to rotate relative thereto. Referring to FIGS. 2–4, the cup seal comprises a disc shaped base portion 21 integrally connected at its periphery to a flexible flange or lip portion 22 adapted to flex radially in bore 13 to continuously provide a circumferential sealing engagement therewith.

As previously mentioned with regard to prior art cup seal constructions, reciprocation of a conventional cup seal past compensating port 14 would tend to extrude peripheral portions of the cup seal therein due to the high pressures prevalent in bore 13. One novel aspect of this invention is a provision of means, preferably in the form of circumferentially disposed grooves 23 formed on the periphery of flange portion 22, for inducing rotation of the cup seal relative to the housing upon reciprocal movement of the piston. Such rotation of the cup seal will prevent one specific area of the flange portion from being continuously subjected to such extrusion which would tend to permanently distort and/or damage the cup seal to induce leakage therearound.

Referring to FIG. 3, the grooves are disposed at an angle $a$, preferably selected from the range of from about 10° to 45° relative to longitudinal axis $X$ of the cup seal. In the illustrated cup seal embodiment, such angle closely approximates 30°. The grooves are preferably equally spaced circumferentially about flange portion 22 and extend generally in the direction of axis $X$ along a distance $L$, from the juncture of base portion 21 with flange portion 22 to terminations at closed ends thereof, which preferably approximates one-half of the axial distance of the flange portion.

The cup seal is preferably composed of a cured elastomeric material, such as a plastic or rubber composition, which is resistant to brake cylinder fluid and which will maintain its required flexibility, elasticity and resiliency throughout a wide temperature range. For example, the cup seal may comprise an ethylene propylene diene-modified cured rubber composition (E.P.D.M.). The rubberized portion of the cup seal may further have an acrylic resis (e.g. trimethylol propane trimethacrylate) mixed therein to comprise from two to twenty parts by weight of every 100 parts by weight of the rubber polymer in the cup seal to increase the hardness and extrusion resistance thereof.

Another novel feature of this invention, which further increases the life expectancy of the cup seal, comprises a reinforcing fabric 24 encapsulated in at least the flange portion thereof. In the preferred embodiment, the fabric is cup-shaped to have its flange portion 25 disposed in substantial co-extensive relationship with respect to a flange portion 22 of the cup seal. The fabric may constitute a nylon, polyester, glass fiber, metal, or polyimide material, polytetrafluoroethylene (Teflon) or other suitable woven fabric. The increased stiffness afforded by the fabric aids in resisting the above-mentioned extrusion of flange portion 22 of the cup seal into port 14 upon reciprocation of the cup seal. Such extrusion could cause "nibbling" of the base portion at its juncture with the flange portion to occur to thus induce leakage, particularly when the master cylinder is actuated and high pressures are prevalent.

We claim:

1. In a master brake cylinder comprising a housing defining a bore therein, a piston reciprocally mounted in said bore for movement along a longitudinal axis thereof and an elastomeric cup seal disposed in said bore to be reciprocated along with said piston and having disc shaped base portion integrally connected at its periphery to a flexible annular flange portion thereof disposed in sealing relationship within said bore, the improvement wherein said annular flange portion comprises means formed thereon for inducing rotation of said cup seal relative to said housing upon reciprocal movement of said piston, said means comprising a plurality of circumferentially disposed grooves formed on a periphery of said flange portion with each groove extending generally in the direction of said longitudinal axis from an open end thereof disposed at the junction of said base portion with said flange portion to a termination at a closed end thereof disposed between the axial ends of said cup seal.

2. The cylinder of claim 1 wherein said grooves are each disposed at an angle selected from the range of from 10° to 45° relative to said longitudinal axis.

3. The cylinder of claim 2 wherein said angle approximates 30°.

4. The cylinder of claim 1 wherein said grooves are equally spaced circumferentially about said flange portion.

5. The cylinder of claim 1 wherein said grooves terminate, approximately one-half of the axial length of said flange portion.

6. The cylinder of claim 1 wherein said cup seal is composed of a cured elastomeric composition having a reinforcing fabric encapsulated in at least the flange portion thereof.

7. The cylinder of claim 6 wherein said fabric is cup shaped and has a flange portion which is substantially co-extensive with respect to the flange portion of said cup seal.

8. The cylinder of claim 6 wherein said fabric is selected from a group of materials consisting of nylon, polyester, glass fiber, metal, or polyimide.

9. The cylinder of claim 6 wherein said fabric constitutes polytetrafluoroethylene.

10. The cylinder of claim 1 wherein said cup seal comprises an ethylene propylene diene-modified cured rubber.

11. The cylinder of claim 10 wherein said cup seal further comprises an acrylic resin comprising from two to twenty parts by weight for every one hundred parts by weight of rubber polymer of said cup seal.

12. The cylinder of claim 11 wherein said acrylic resin constitutes trimethylol propane trimethacrylate.

13. In a master brake cylinder comprising a housing defining a bore therein, a piston reciprocally mounted in said bore for movement along a longitudinal axis thereof and an elastomeric cup seal disposed in said bore to be reciprocated by said piston and having disc shaped base portion integrally connected at its periphery to a flexible annular flange portion thereof disposed in sealing relationship within said bore, the improvement wherein said cup seal is composed of a cured elastomeric material having a cup shaped reinforcing fabric encapsulated in each of the base and flange portions thereof, said fabric having a flange portion which is substantially coextensive with respect to the flange portion of said cup seal but terminating short of a free axial end thereof and groove means formed on the flange portion of said cup seal for inducing rotation of said cup seal relative to said housing upon reciprocal movement of said piston.

14. The cylinder of claim 13 wherein said fabric constitutes a nylon-polyester material.

15. The cylinder of claim 13 wherein said fabric constitutes polytetrafluoroethylene.

* * * * *